US011951597B2

(12) United States Patent
Hsu

(10) Patent No.: US 11,951,597 B2
(45) Date of Patent: Apr. 9, 2024

(54) HAND TOOL AND GRIPPING SLEEVE THEREOF

(71) Applicant: Ming-Lung Hsu, Taichung (TW)

(72) Inventor: Ming-Lung Hsu, Taichung (TW)

( * ) Notice: Subject to any disclaimer, the term of this patent is extended or adjusted under 35 U.S.C. 154(b) by 855 days.

(21) Appl. No.: 17/065,074

(22) Filed: Oct. 7, 2020

(65) Prior Publication Data

US 2021/0016422 A1 Jan. 21, 2021

Related U.S. Application Data

(63) Continuation-in-part of application No. 15/997,121, filed on Jun. 4, 2018, now abandoned.

(30) Foreign Application Priority Data

Jul. 5, 2017 (TW) ................................ 106122489

(51) Int. Cl.
*B25B 23/00* (2006.01)
*B25B 13/06* (2006.01)
*B25G 1/00* (2006.01)

(52) U.S. Cl.
CPC ...... *B25B 23/0021* (2013.01); *B25B 23/0035* (2013.01); *B25G 1/005* (2013.01); *B25B 13/06* (2013.01)

(58) Field of Classification Search
CPC . B25B 23/0021; B25B 23/0035; B25B 13/06; B25G 1/005
USPC .................................................... 81/436–439
See application file for complete search history.

(56) References Cited

U.S. PATENT DOCUMENTS 7,013,765 B2 * 3/2006 Chang .................... B25G 1/005 81/177.85
8,876,120 B2 * 11/2014 Chen ................... B25B 23/0035 279/143
10,688,633 B2 * 6/2020 Lee ........................ B25G 1/063
2007/0214916 A1 9/2007 Lee
2010/0101380 A1 4/2010 Chen
2011/0023666 A1 * 2/2011 Hsu ..................... B25B 23/1427 81/438
2013/0149027 A1 6/2013 Lin
2014/0090520 A1 4/2014 Lee
2015/0143966 A1 5/2015 Pischke et al.
2015/0321332 A1 11/2015 Lee
(Continued)

FOREIGN PATENT DOCUMENTS

TW I581919 B 5/2017

*Primary Examiner* — Hadi Shakeri
(74) *Attorney, Agent, or Firm* — Muncy, Geissler, Olds & Lowe, P.C.

(57) ABSTRACT

A gripping sleeve is provided, including: a first sleeve, being substantially tubular and having at least one through hole; at least one restricting member, received in the through hole; a second sleeve, sleeved on the first sleeve and being movable relative to the first sleeve, the restricting member being abutted by the second sleeve and being controllably engaged within an annular groove of a body portion of a main body; an elastic member, disposed around the first sleeve and abutting against the first and second sleeves; a restricting mechanism, arranged on at least one of the first and second sleeves and located between the first sleeve and an outer circumferential face of the second sleeve. A hand tool is further provided, including the main body and the gripping sleeve.

6 Claims, 6 Drawing Sheets

(56) References Cited

U.S. PATENT DOCUMENTS

| | | | |
|---|---|---|---|
| 2016/0107299 | A1 | 4/2016 | Hsu |
| 2016/0263730 | A1 | 9/2016 | Cummings et al. |
| 2018/0185995 | A1 | 7/2018 | Shu |

* cited by examiner

HAND TOOL AND GRIPPING SLEEVE THEREOF

The present invention is a CIP of application Ser. No. 15/997,121, filed Jun. 4, 2018, the entire contents of which are hereby incorporated by reference.

BACKGROUND OF THE INVENTION

Field of the Invention

Description of the Prior Art

A hand tool is often used to screw or disassemble objects from devices. When assembling or disassembling an object, a user needs to rotate the hand tool toward a same direction so as to tighten or loosen the object. When in operation, the user can rotate a gripping portion of the hand tool with one hand, so it is less stable and may cause a connecting rod of the hand tool to fall off from the object.

In a hand tool commonly seen, a gripping sleeve body is sleeved on a middle section of a rod body of the hand tool for the hand tool to rotate relative to the gripping sleeve body, and this type of hand tools are T-type wrenches, Y-type wrenches and ratchet wrenches. In a prior art disclosed in TWI 581919, a controlling member is sleeved on an exterior circumference of a front section of an engaging member; a sleeve is sleeved on the controlling member and screwed to the engaging member, and the sleeve extends radially to form a flange to prevent the controlling member from falling off from the engaging member. However, the prior art has a more complicated structure.

US2016/0263730 discloses that the inner sleeve is much shorter than the outer sleeve, and the receiving groove (between the inner sleeve and the outer sleeve) is therefore of much less depth, which cannot stably guide the second sleeve. The outer sleeve is too short to be gripped by a hand. The second sleeve is provided without any outer flange for axial abutment against the outer sleeve. None of inner flange of the second sleeve is provided to be abutable axially against the restricting mechanism and abutable radially against the restricting member at the same time, which cannot provide good and reliable abutment against the restricting member.

US2015/0143966 discloses that only two sleeves are sleeved with each other and none of receiving groove is provided for receiving a second sleeve, which has structural relationship substantially different the present invention. The outer sleeve 106 is too short to be gripped by a hand.

The present invention has arisen to mitigate and/or obviate the afore-described disadvantages.

SUMMARY OF THE INVENTION

The major object of the present invention is to provide a hand tool and a gripping sleeve thereof which has a simple structure.

To achieve the above and other objects, a gripping sleeve is provided, for being restrictably and slidably sleeved on a body portion of a main body and rotatable relative to the body portion, the body portion has at least one annular groove, and the gripping sleeve includes: a first sleeve, being substantially tubular and having at least one through hole; at least one restricting member, received in the through hole; a second sleeve, sleeved on the first sleeve and being movable relative to the first sleeve, the restricting member being abutted by the second sleeve, a part of the restricting member being controllably engaged within the annular groove; an elastic member, disposed around the first sleeve and abutting against and between the first sleeve and the second sleeve; a restricting mechanism, arranged on at least one of the first sleeve and the second sleeve and located between the first sleeve and an outer circumferential face of the second sleeve; the first sleeve further includes an outer sleeve and an inner sleeve, a receiving groove is formed between the inner sleeve and the outer sleeve and extends axially, and the second sleeve is sleeve on the inner sleeve and movably arranged within the receiving groove.

To achieve the above and other objects, a hand tool is provided, including the above-mentioned gripping sleeve and main body, wherein the main body further includes a driving portion which is connected to one of two ends of the body portion and a joint which is connected to the other of the two ends of the body portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
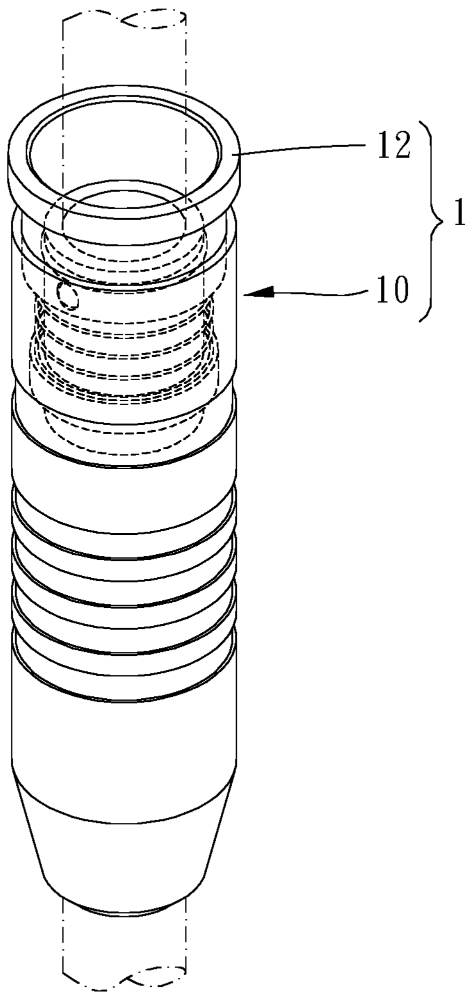
FIG. 1 is a stereogram of a first preferred embodiment of the present invention.
Figure 2:
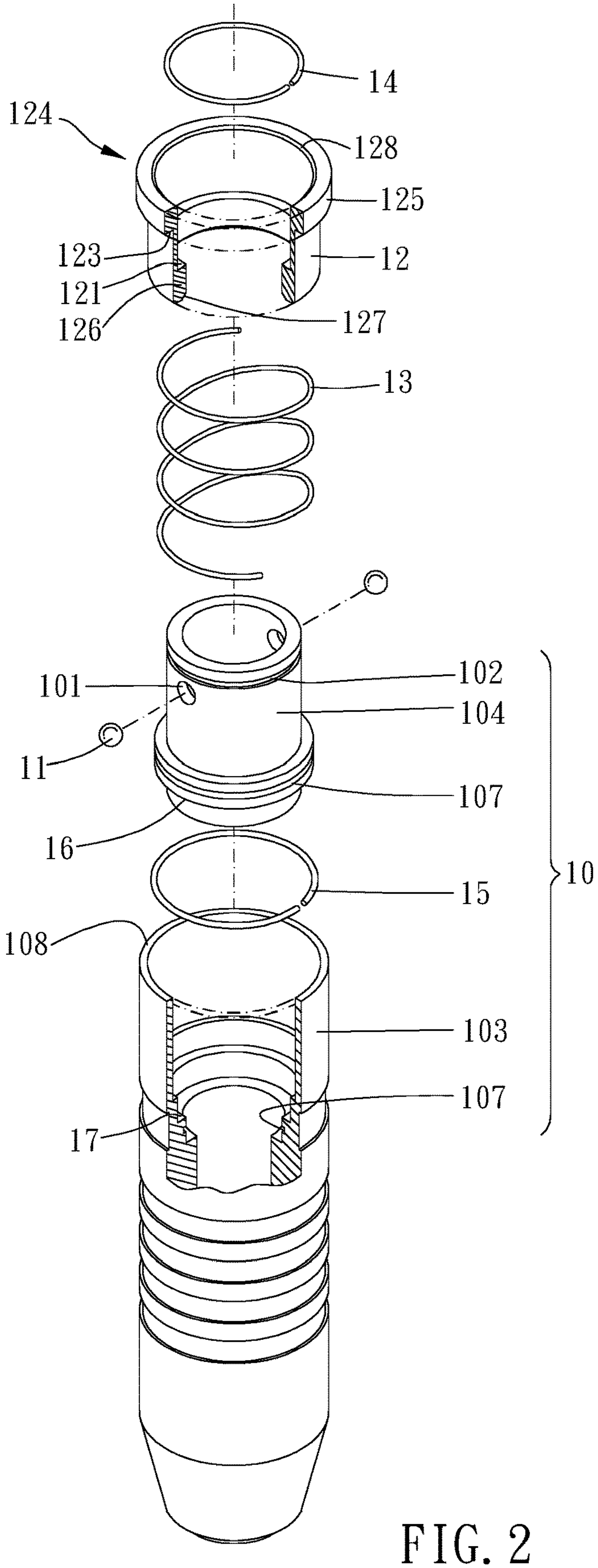
FIG. 2 is a perspective breakdown of the first preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 4 and FIG. 4A for a first preferred embodiment of the present invention. A gripping sleeve 1 is provided for being restrictably and slidably sleeved on a body portion 21 of a main body 20 and rotatable relative to the body portion 21, the body portion 21 has at least one annular groove 22, and the gripping sleeve 1 includes a first sleeve 10, at least one restricting member 11, a second sleeve 12, an elastic member 13 and a restricting mechanism 14.

The first sleeve 10 is substantially tubular and has at least one through hole 101, more specifically, the first sleeve 10 has two through holes 101 which are opposite to each other, and the first sleeve 10 may have one, three, four or more through holes 101. With a plurality of through holes 101, the plural of through holes 101 are preferably arranged equidistantly, but not limited thereto. The at least one restricting member 11 is received in the through hole 101, in this embodiment, a number of the at least one restricting member is two, the two restricting members are respectively received in one of the plurality of through holes, and preferably, each said restricting member 11 is a ball, for example, a bead, a steel ball or other similar structures. The second sleeve 12 is sleeved on the first sleeve 10 and is movable relative to the first sleeve 10, the restricting member 11 is abutted by the second sleeve 12, and a part of the restricting member 11 is controllably engaged within the annular groove 22 so as to make the gripping sleeve 1 engaged with the main body 20 so that the gripping sleeve 1 will not slide relative to the main body 20 or detach from the main body 20. The elastic member 13 is disposed around the first sleeve 10 and abuts against and between the first sleeve 10 and the second sleeve 12. The restricting mechanism 14 is arranged on at least one of the first sleeve 10 and the second sleeve 12 and located between the first sleeve 10 and an outer circumferential face of the second sleeve 12.

The restricting mechanism 14 is an annular clip, for example, a C-shaped clip, for being quickly assembled and disassembled, and the restricting mechanism 14 may be an annular clip which is continuously closed. In this embodiment, the restricting mechanism 14 is arranged on the first sleeve 10, preferably, the first sleeve 10 has an annular recess 102, and the restricting mechanism 14 is arranged in the annular recess 102 and radially protrudes beyond the annular recess 102 so that the restricting mechanism 14 is engaged with the first sleeve 10 and will not detach from the first sleeve 10 easily. An inner wall of the second sleeve 12 includes a blocking face 121 between the annular clip and the elastic member 13, and the blocking face 121 abuts against the annular clip to prevent the second sleeve 12 from falling off from the first sleeve 10 when being impacted by an exterior force (for example, the elastic member 13). More specifically, one end of the second sleeve 12 has a bottom face 122 which is opposite to the blocking face 121, and the elastic member 13 abuts against the bottom face 122.

The first sleeve 10 further includes an outer sleeve 103 and an inner sleeve 104, the second sleeve 12 is sleeved on the inner sleeve 104, a receiving groove 105 is formed between the inner sleeve 104 and the outer sleeve 103 and extends axially, the second sleeve 12 is sleeve on the inner sleeve 104 and movably arranged within the receiving groove 105, and the second sleeve 12 is stably movable relative to the receiving groove 105. In this embodiment, the elastic member 13 abuts against the second sleeve 12 and the inner sleeve 104, and the second sleeve 12 has a pressing portion 124 which partly protrudes axially beyond the receiving groove 105 so that it is convenient for a user to operate. A flange of the pressing portion 124 facing the outer sleeve 103 has an annular abutting face 123 which extends radially to restrict the second sleeve 12 to move relative to the first sleeve 10 within a released position.

The gripping sleeve 1 further includes a positioning mechanism 15, and the positioning mechanism 15 is arranged on at least one of the inner sleeve 104 and the outer sleeve 103 and located between the inner sleeve 104 and the outer circumferential face of the outer sleeve 103. In this embodiment, the positioning mechanism 15 is an annular member, for example, a C-shaped clip, for being quickly assembled and disassembled, and the positioning mechanism 15 may be an annular member which is continuously closed. In this embodiment, two opposite sides of the annular member are respectively partly engaged in the inner sleeve 104 and the outer circumferences of the outer sleeve 103. More specifically, at least one of circumferential faces of the inner sleeve 104 and the outer sleeve 103 has a ditch 107, the annular member is arranged in the ditch 107 and radially protrudes beyond the ditch 107, and one of the inner sleeve 104 and the outer sleeve 103 is abuttable against the annular member; in this embodiment, the inner sleeve 104 and the outer sleeve 103 respectively have the ditch 107 corresponding to each other, the two opposite sides of the annular member are respectively arranged in the ditch 107 so that the inner sleeve 104 and the outer sleeve 103 can be fixedly connected to each other prevent the inner sleeve 104 and the outer sleeve 103 from sliding relative to and detaching from each other. In this embodiment, the outer sleeve 103 is greater than the inner sleeve 104 in length, and the outer sleeve 103 may be for the user to grip thereon. Specifically, the inner sleeve 104 is axially protrusive beyond the outer sleeve 103 in a direction from the elastic member 13 toward the at least one restricting member 11. The receiving groove 105 extends axially more than half the length of the inner sleeve 104. The outer sleeve 103 is integrally formed of one piece and has a length larger than the combined length of the second sleeve 12 and the inner sleeve 104. The second sleeve 12 further has an outer flange 125 which radially and annularly protrudes outwardly and an inner flange 126 which radially and annularly protrudes inwardly at two ends thereof, the outer flange 125 is axially abutable against an end face 108 of the outer sleeve 103 which faces axially, and the inner flange 126 is abutable axially against the restricting mechanism 14 and abutable radially against the at least one restricting member 11 at the same time. The inner flange 126 includes an inner corner chamfer 127 extending annularly therearound, and the elastic member 13 is abutted against and between the inner corner chamfer 127 and the inner sleeve 104. The outer flange 125 includes an inner corner chamfer 128 extending annularly therearound, and the inner flange 126 includes an inner corner chamfer 130 extending annularly therearound and an outer corner chamfer 129 extending annularly therearound. When the outer flange 125 is axially abutted against the end face 108 of the outer sleeve 103, the inner flange 126 and the at least one restricting member 11 do not overlap.

Figure 4:
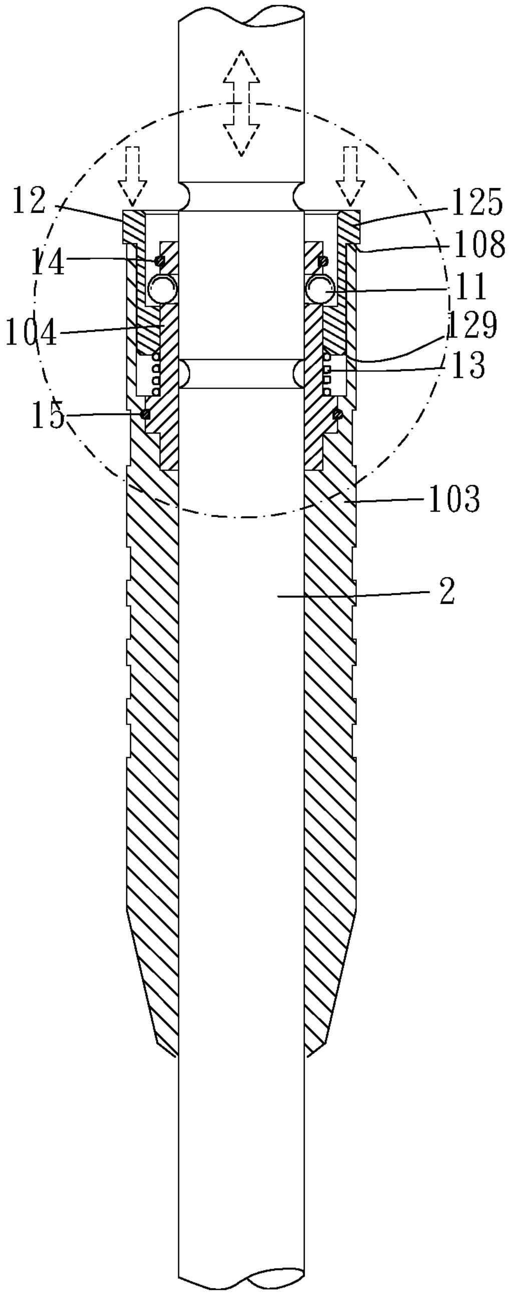
FIG. 4 is a drawing showing the first preferred embodiment of the present invention in movement.
Figure 4A:
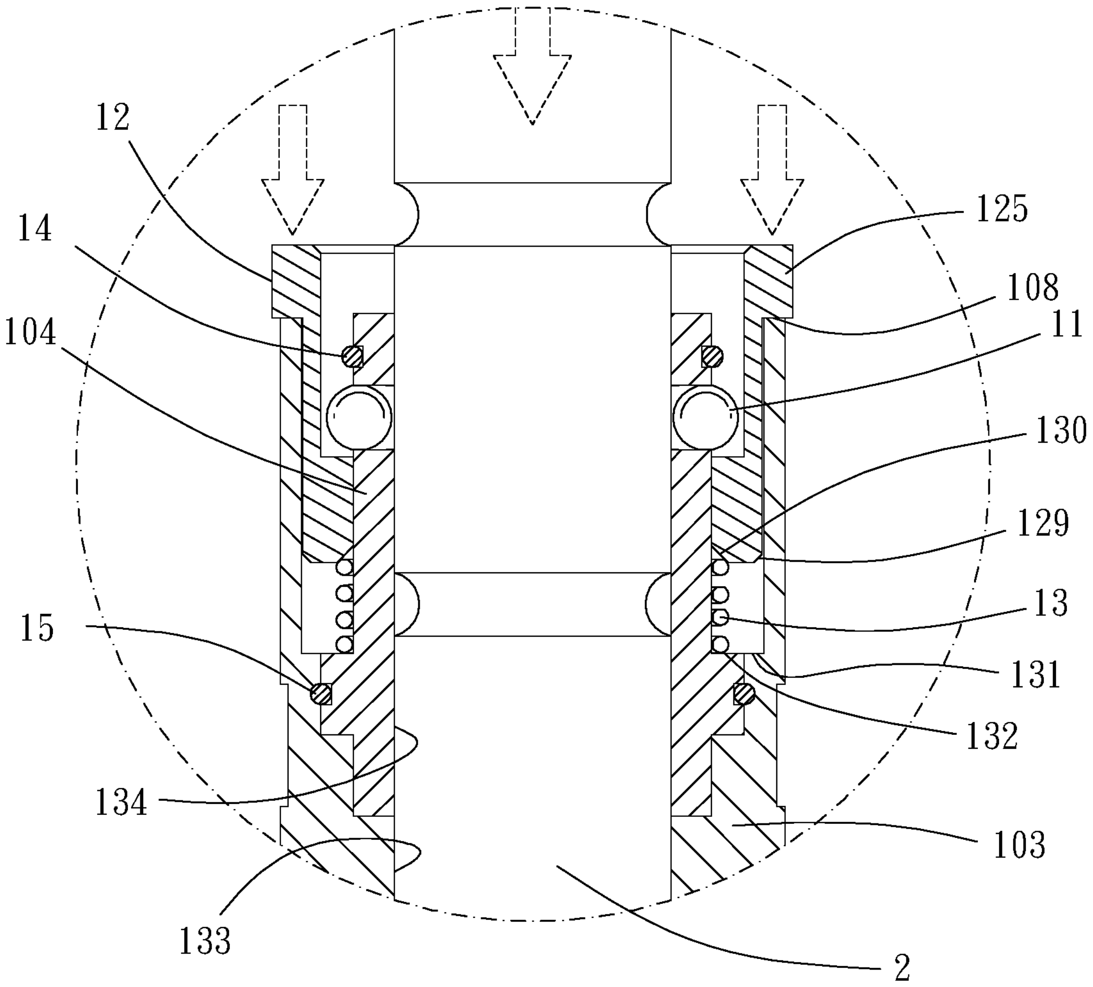
FIG. 4A is a partial enlarged view of FIG. 4.

Specifically, as shown in FIG. 4A, the second sleeve 12 is integrally formed of one piece. The receiving groove 105 is axially open at one end. The outer sleeve 103 includes an annular face 131 axially facing the outer corner chamfer 129 of the inner flange 126 and an inner circumferential surface 133, and the inner sleeve 104 further includes an annular face 132 axially facing the inner corner chamfer 130 of the inner flange 126 and an inner circumferential surface 134. The annular face 132 of the inner sleeve 104 is radially aligned with the annular face 131 of the outer sleeve 103, and the inner circumferential surface 134 of the inner sleeve 104 is axially aligned substantially gaplessly with and extends from the inner circumferential surface 133 of the outer sleeve 103. The annular face 132 of the inner sleeve 104 and the annular face 131 of the outer sleeve 103 form a bottom side of the receiving groove 105. The elastic member 13 abuts against the annular face 132 of the inner sleeve 104 and the inner corner chamfer 130 of the inner flange 126 and is positioned between the inner corner chamfer 130 of the inner flange 126 and an outer circumferential surface of the inner sleeve 104.

Figure 5:
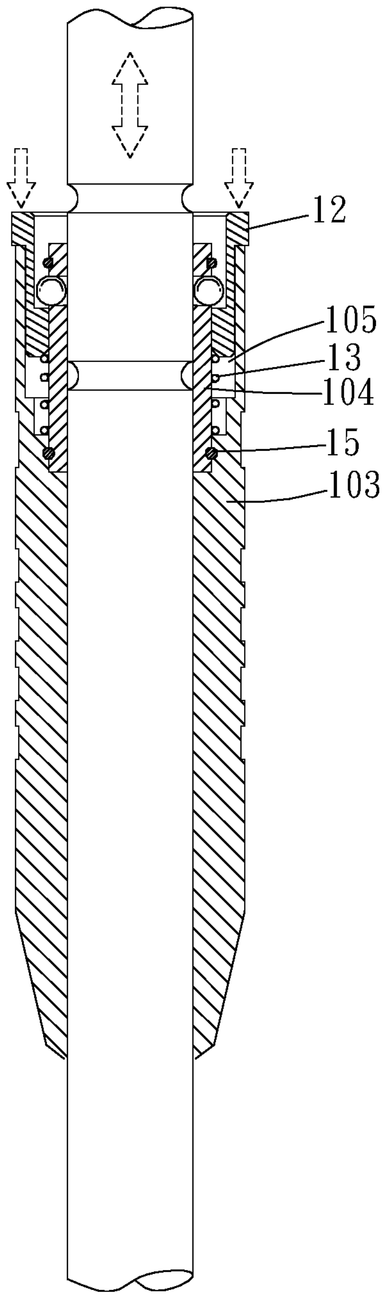
FIG. 5 is a cross-sectional view of a second preferred embodiment of the present invention.

Please refer to FIG. 5 for a second preferred embodiment. The difference between the first and second preferred embodiments is that the elastic member 13 abuts against the second sleeve 12 and the outer sleeve 103.

A hand tool 2 is further provided, including the above-mentioned gripping sleeve 1, and further including a main body 10. The main body 10 includes a body portion 21, the body portion 21 has at least one annular groove 22, the gripping sleeve 1 is restrictably and slidably sleeved on the body portion 21 of the main body 20 and rotatable relative to the body portion 21, the restricting member 11 is abutted by the second sleeve 12, and a part of the restricting member

Figure 3:
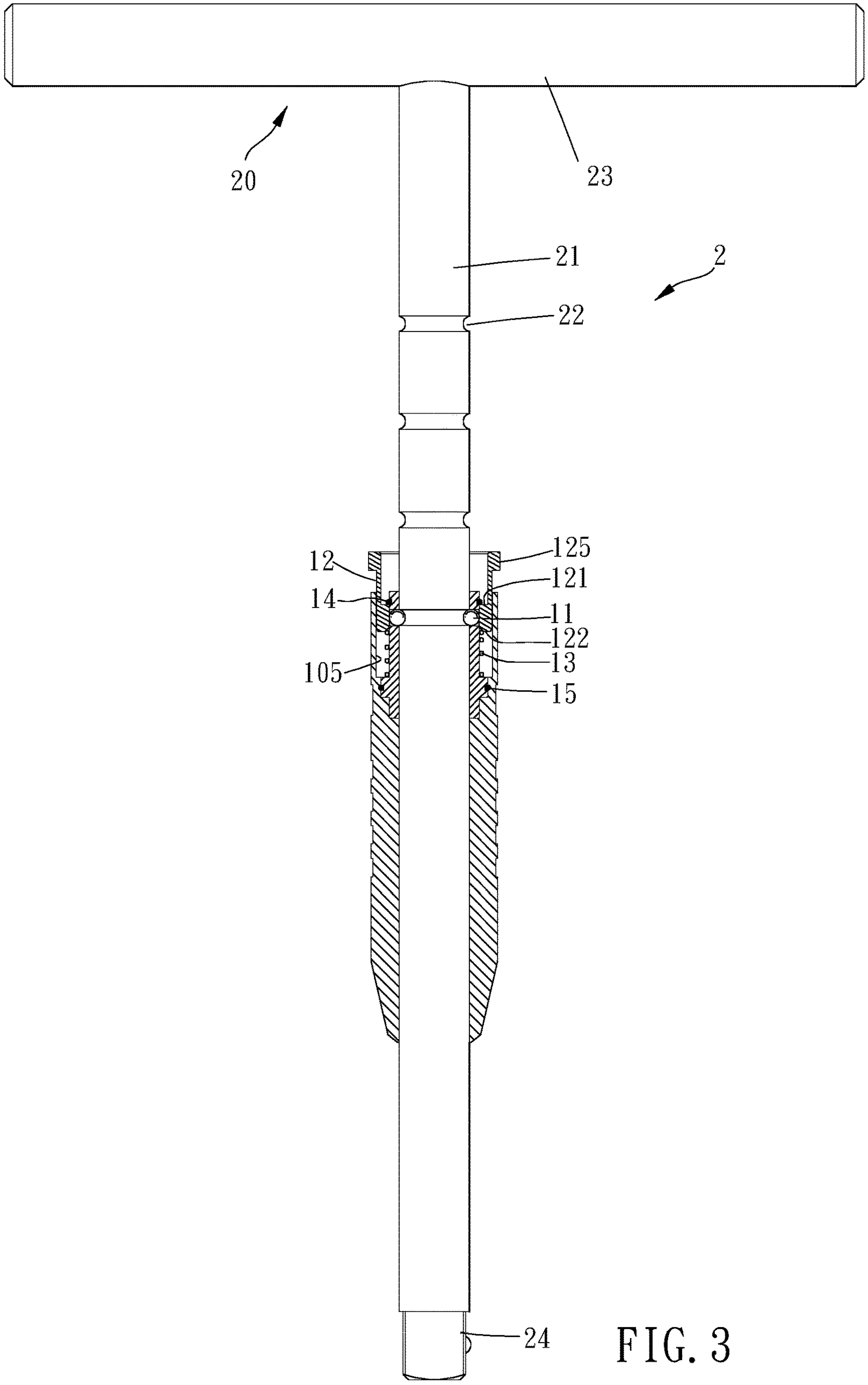
FIG. 3 is a cross-sectional view of the first preferred embodiment of the present invention.

11 is controllably engaged within the annular groove 22. When the second sleeve 12 is on a restricted position, as shown in FIG. 3, each said restricting member 11 is abutted by the second sleeve 12, and a part of the restricting member 11 is controllably engaged within the annular groove 22 and further makes the gripping sleeve 1 engaged with the body portion 21. In addition, the second sleeve 12 may also be moved relatively to the released portion, as shown in FIG. 4, to lift restriction so that the gripping portion 1 can slide relative to the body portion 21 of the main body 20, and the user can move the gripping sleeve 1 to change restriction positions of the gripping sleeve 1 and the body portion 21 of the main body 20 or to remove the gripping sleeve 1 from the body portion 21 of the main body 20. In this embodiment, the main body 20 further includes a driving portion 23 which is connected to one of two ends of the body portion 21 and a joint 24 which is connected to the other of the two ends of the body portion 21, the driving portion 23 may be a horizontal rod, for example, the driving portion 23 may be perpendicularly connected to the body portion 21 to be T-shaped, and the driving portion 23 may be a polygon or a ball; and the joint 24 may be sleeved on, for example, a socket.

While we have shown and described various embodiments in accordance with the present invention, it should be clear to those skilled in the art that further embodiments may be made without departing from the scope of the present invention.

What is claimed is:

1. A gripping sleeve, for being restrictably and slidably sleeved on a body portion of a main body and rotatable relative to the body portion, the body portion having at least one annular groove, the gripping sleeve including:

a first sleeve, being substantially tubular and having at least one through hole;

at least one restricting member, received in the through hole;

a second sleeve, sleeved on the first sleeve and being movable relative to the first sleeve, the restricting member being abutted by the second sleeve, a part of the restricting member being controllably engaged within the annular groove;

an elastic member, disposed around the first sleeve and abutting against and between the first sleeve and the second sleeve;

a restricting mechanism, arranged on the first sleeve and located between the first sleeve and an inner circumferential face of the second sleeve;

wherein the first sleeve further includes an outer sleeve and an inner sleeve surrounded by the outer sleeve, the inner sleeve is axially protrusive beyond the outer sleeve in a direction from the elastic member toward the at least one restricting member, a receiving groove is formed between the inner sleeve and the outer sleeve and extends axially, the receiving groove extends axially more than half the length of the inner sleeve, and the second sleeve is sleeved on the inner sleeve and movably arranged within the receiving groove;

wherein the outer sleeve is integrally formed of one piece and has a length larger than the combined length of the second sleeve and the inner sleeve;

wherein the second sleeve is integrally formed with an outer flange which radially and annularly protrudes outwardly and an inner flange which radially and annularly protrudes inwardly at two ends thereof, the outer flange is axially abutable against an end face of the outer sleeve which faces axially, and the inner flange is abutable axially against the restricting mechanism and abutable radially against the at least one restricting member at the same time;

wherein the second sleeve is integrally formed of one piece;

wherein the receiving groove is axially open at one end;

wherein the outer flange includes an inner corner chamfer extending annularly therearound, and the inner flange includes an inner corner chamfer extending annularly therearound and an outer corner chamfer extending annularly therearound;

wherein the outer sleeve includes an annular face axially facing the outer corner chamfer of the inner flange and an inner circumferential surface, and the inner sleeve includes an annular face axially facing the inner corner chamfer of the inner flange and an inner circumferential surface;

wherein the annular face of the inner sleeve is radially aligned with the annular face of the outer sleeve, and the inner circumferential surface of the inner sleeve is axially aligned substantially gaplessly with and extends from the inner circumferential surface of the outer sleeve;

wherein the annular face of the inner sleeve and the annular face of the outer sleeve form a bottom side of the receiving groove;

wherein the elastic member abuts against the annular face of the inner sleeve and the inner corner chamfer of the inner flange and is positioned between the inner corner chamfer of the inner flange and an outer circumferential surface of the inner sleeve;

wherein when the outer flange is axially abutted against the end face of the outer sleeve, the inner flange and the at least one restricting member do not overlap.

2. The gripping sleeve of claim 1, further including a positioning mechanism, the positioning mechanism arranged on at least one of the inner sleeve and the outer sleeve and located between the inner sleeve and the outer circumferential face of the outer sleeve.

3. The gripping sleeve of claim 1, wherein the restricting mechanism is an annular clip, the restricting mechanism is arranged on the first sleeve, and an inner wall of the second sleeve includes a blocking face between the annular clip and the elastic member.

4. The gripping sleeve of claim 3, wherein the first sleeve has an annular recess, and the restricting mechanism is arranged in the annular recess and radially protrudes beyond the annular recess.

5. The gripping sleeve of claim 4, wherein the second sleeve further has a pressing portion which partly protrudes axially beyond the receiving groove; the outer flange has an annular abutting face which extends radially; the outer sleeve is greater than the inner sleeve in length; the gripping sleeve further includes a positioning mechanism, the positioning mechanism is arranged on at least one of the inner sleeve and the outer sleeve and located between the inner sleeve and the outer circumferential face of the outer sleeve; the positioning mechanism is an annular member, at least one of circumferential faces of the inner sleeve and the outer sleeve has a ditch, the annular member is arranged in the ditch and radially protrudes beyond the ditch, and one of the inner sleeve and the outer sleeve is abuttable against the annular member; one of the inner sleeve and the outer sleeve radially protrudes to form a stepped protrusion, and the other of the inner sleeve and the outer sleeve has a stepped groove which corresponds to be assemblable with the stepped protrusion.

6. A hand tool, including the gripping sleeve and the main body of claim 1, wherein the main body further includes a driving portion which is connected to one of two ends of the body portion and a joint which is connected to the other of the two ends of the body portion.

* * * * *